March 31, 1970 V. F. PIZZURRO ET AL 3,504,182

OPTICAL COMMUNICATION SYSTEM

Filed Oct. 14, 1966 3 Sheets-Sheet 1

INVENTORS
VITO F. PIZZURRO, HARVEY E. FIALA,
LOUIS A. DE BOTTARI, SHIRO A. UCHIZONO,
BY LOWELL M. RUBIN,

Sidney Magnes

AGENT

March 31, 1970 V. F. PIZZURRO ET AL 3,504,182

OPTICAL COMMUNICATION SYSTEM

Filed Oct. 14, 1966 3 Sheets-Sheet 2

INVENTORS
VITO F. PIZZURRO, HARVEY E. FIALA,
LOUIS A. DE BOTTARI, SHIRO A. UCHIZONO,
LOWELL M. RUBIN,
BY Sidney Magnes
AGENT INVENTORS
VITO F. PIZZURRO, HARVEY E. FIALA,
LOUIS A. DE BOTTARI, SHIRO A. UCHIZONO,
BY LOWELL M. RUBIN, Sidney Magnes
AGENT United States Patent Office 3,504,182
Patented Mar. 31, 1970

3,504,182
OPTICAL COMMUNICATION SYSTEM
Vito F. Pizzurro, Villa Park, Harvey E. Fiala, Downey, Louis A. De Bottari, Torrance, and Shiro A. Uchizono, Gardena, Calif., and Lowell M. Rubin, Brooklyn, N.Y., assignors to North American Rockwell Corporation
Filed Oct. 14, 1966, Ser. No. 586,697
Int. Cl. H04b *9/00*
U.S. Cl. 250—199 48 Claims

ABSTRACT OF THE DISCLOSURE

This invention relates to a communication system; and more particularly to a communication system using a light-beam as the information-carrying medium.

BACKGROUND

There is an ever-increasing need for better communication systems; this need arising, for example, in space communications where the vehicles and/or satellites and/or earth stations that are trying to communicate with each other are extremely long distances apart. Due to the distances involved, it has been found that radio communication-systems require extremely bulky equipment; whereas an optical communication-system can be compressed into a suitcase-sized arrangement. Part of the reason for the compactness of the optical communication system results from the use of lasers, which produce an intense, narrow, scarcely-divergent beam of light that concentrates the light-beam energy—in contrast to radio beams that diverge, and thus spread their energy over a large area. As a comparison, a typical radio beam has a 3-degree angle or beam width; whereas the laser beam used for this work has a 1/100 degree angle or beam width. Another reason for the compactness of the optical communication system is the availability of small, compact, lightweight components that are capable of "modulating" the laser light-beam—the modulations, of course, carrying the information that is to be communicated. Because of the high frequency, an optical carrier beam is capable of carrying more information.

OBJECTS AND DRAWINGS

It is an object of the present invention to provide an improved optical communication system.

It is another object of the present invention to provide an improved two-way optical communication system that is relatively simple, lightweight, and compact.

It is a further object of the present invention to provide an improved two-way optical communication system wherein each station can "acquire" its target, and can track its target as the home station or its target moves.

Figure 1:
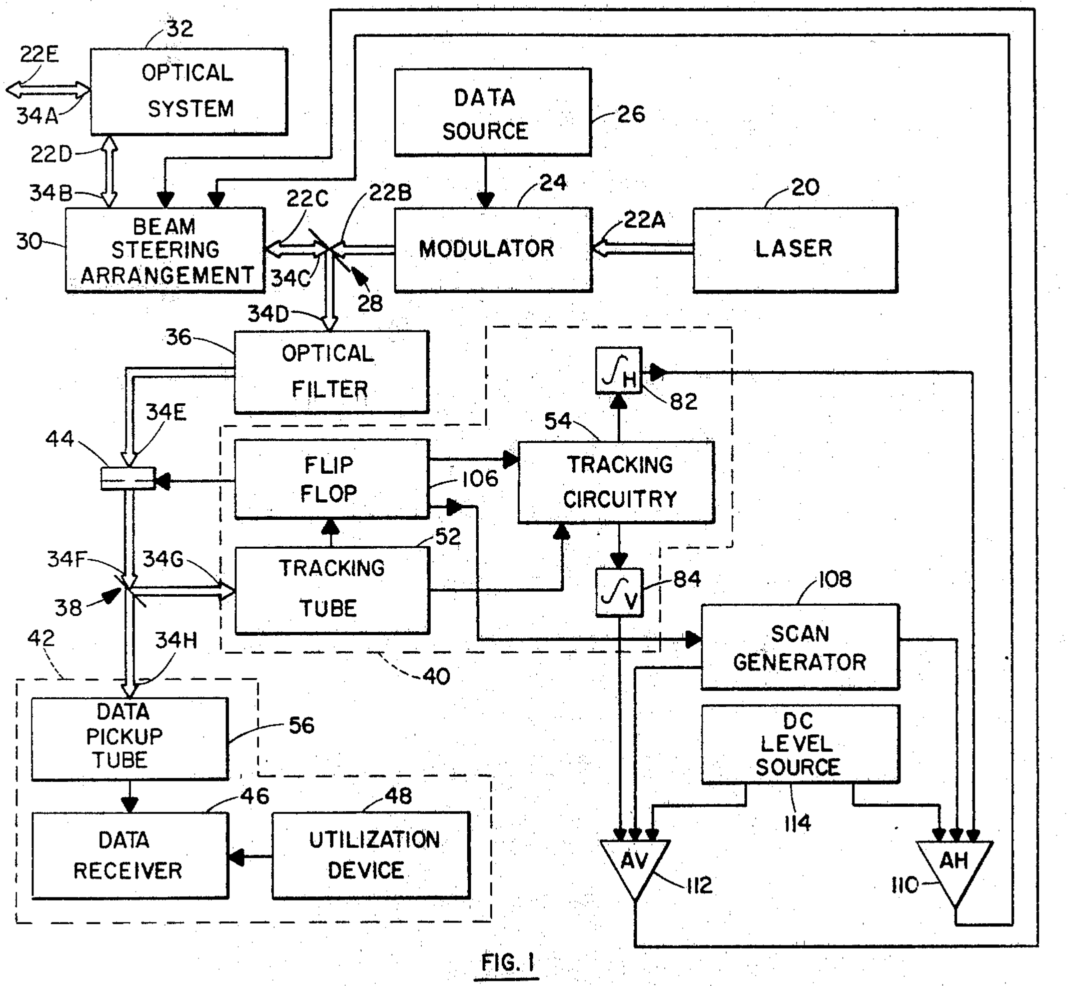
Figure 2:
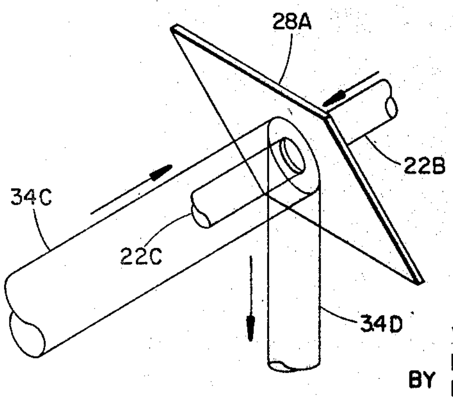
Figure 3A:
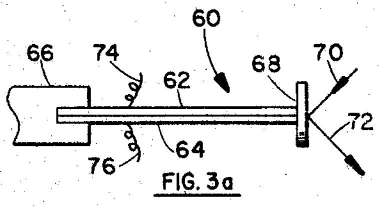
Figure 3B:
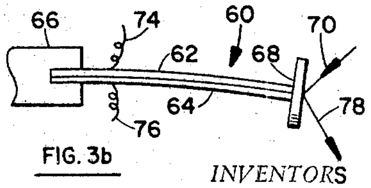
Figure 4:
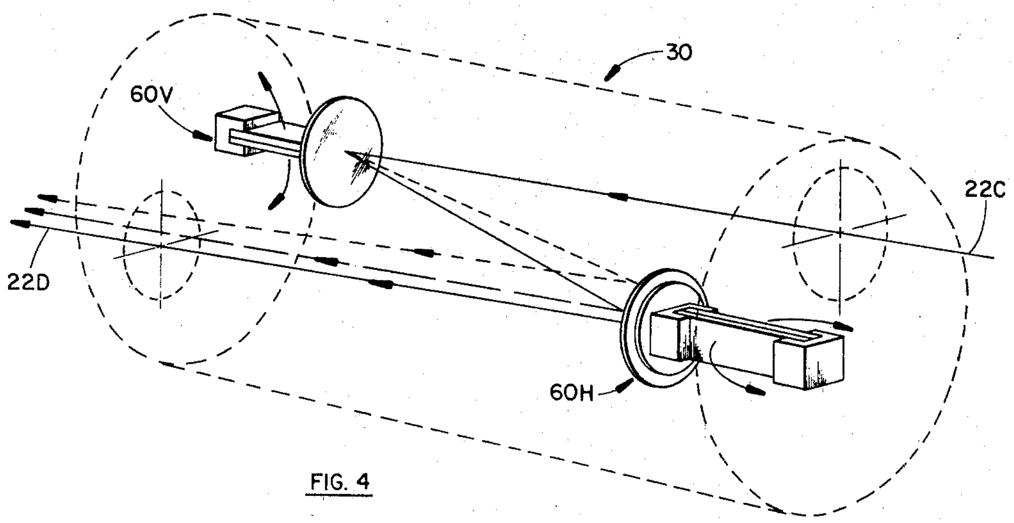
Figure 5:
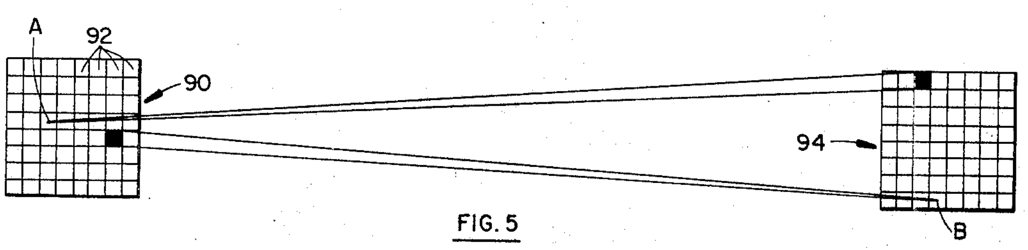
Figure 6:
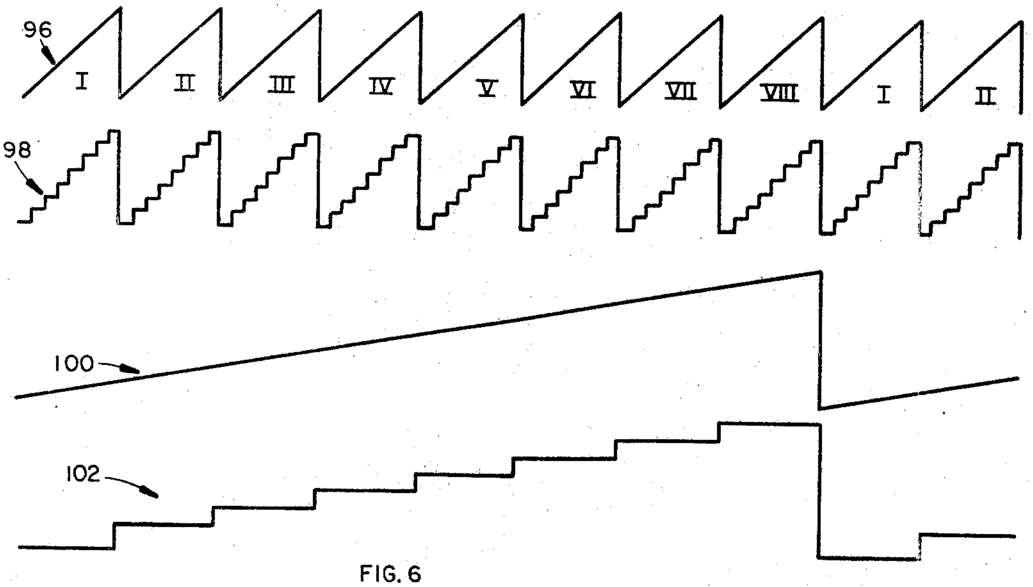
Figures 7, 8:
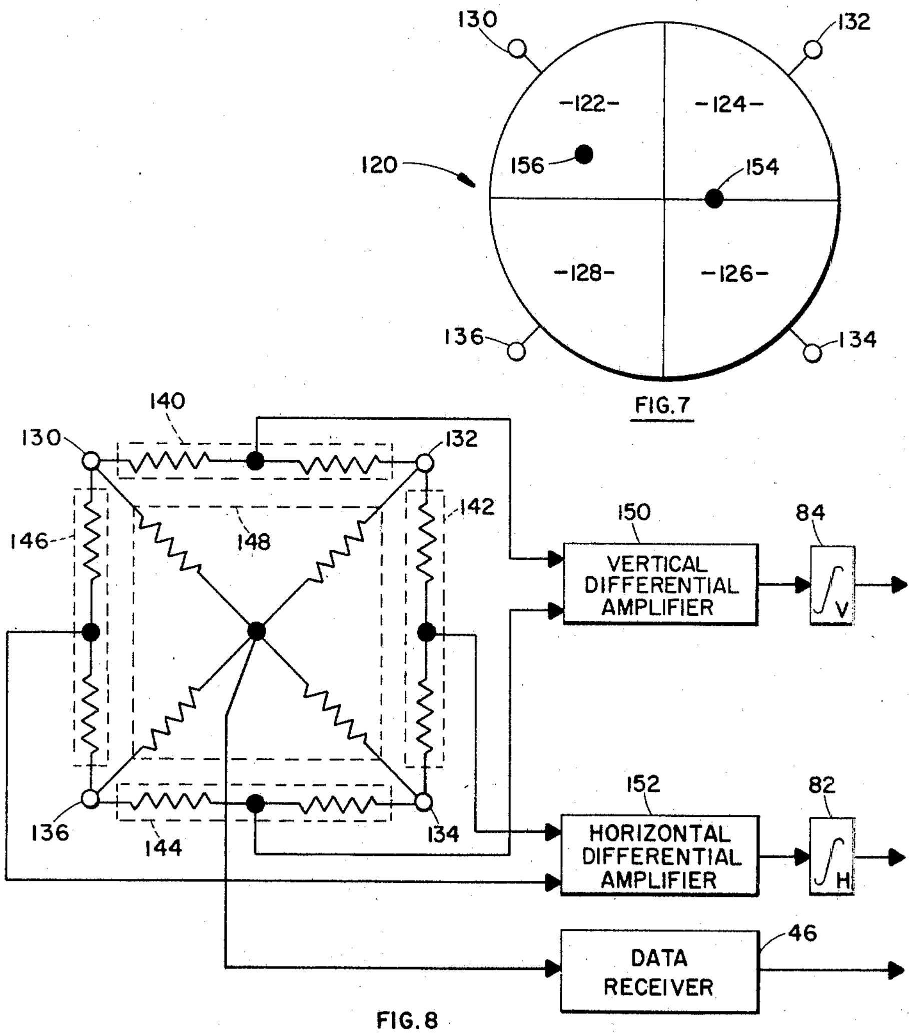
Figure 9:
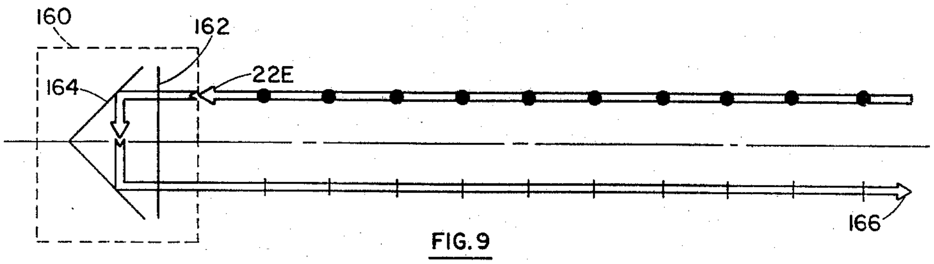

The attainment of these objects, and others, will be realized from the teachings of the following specification; taken in conjunction with the drawings, of which FIGURE 1 shows a block diagram of one station;
FIGURE 2 shows a beam separator;
FIGURES 3*a* and 3*b* show a beam-steerer;
FIGURE 4 shows a beam-steerer assembly;
FIGURE 5 shows one acquisition method;
FIGURE 6 shows scanning waveforms;
FIGURE 7 shows the faceplate of a tracking tube;
FIGURE 8 shows a circuit used with the tracking tube; and
FIGURE 9 shows a retroreflector assembly used for acquisition.

SYNOPSIS

Broadly speaking, the present optical communication-system comprises a light source, such as a laser, whose light beam may be modulated to carry the desired information. The light from the laser is then directed to a plurality of devices, designated as "beam-steerers," that steer the light toward the target. At the target, the light-beam is received and demodulated; and its information content is recovered.

In order to "acquire" its target, a first "home" station "A" causes its light-beam to scan a given target-area, known to contain a target station "B"; and simultaneously, the target station "B" causes its light-beam to scan the area that is known to contain station A. The operations of station A and station B are such that when the scanning pattern of each station acquires the other, the stations "lock" on; and each station is then ready to transmit information to the other station, and to receive information from the other station.

DESCRIPTION OF THE INVENTION

A basic embodiment of the invention is shown in FIGURE 1, the various components thereof to be discussed in greater detail subsequently. At each station, a laser 20 produces a light-beam—which is to be construed as including infrared radiations. For convenience the exiting light-beam from laser 20 will be designated 22A, 22B, etc., as it traverses various devices, and will have arrowheads indicating an outward direction. Light-beam 22A emerges from laser 20, and has information impressed thereon by a modulator 24, that in turn receives its signals from a data-source 26. The information-bearing modulated light-beam 22B from modulator 24 is directed through a beam-separator 28, the emergent light-beam 22C passing to a beam-steering arrangement 30 positioned on the output-side of the beam-separator. The beam-steering arrangement 30 directs its emergent light-beam 22D to an optical system 32 that produces an exiting light-beam 22E.

The characteristics of the laser and the optical system produce an exiting light-beam 22E that is intense and highly-collimated, so that light-beam 22E is capable of travelling extremely long distance without diverging to an undesirable extent. In this way, an exiting narrow-beam-width information-bearing energy-beam is directed from a "home" station "A" toward a second (not shown) "target" station "B." The optical system 32 also receives incoming light in a field of substantially the same narrow beam width; that is, the effective transmitting and receiving patterns are substantially spatially coextensive.

The second station B (not shown) has substantially the same light-beam generating, modulating, and transmitting equipment; and its exiting light-beam is directed toward station A of FIGURE 1, in substantially the same way as described above.

At station A, of FIGURE 1, the incoming light-beam (from station B) is designated as 34A, 34B, etc. as it traverses various devices, and will have arrowheads indicating an inward direction. Incoming light-beam 34A from station B traverses optical system 32, and—as light-beam 34B—impinges onto beam-steering arrangement 30; from where it is directed—as light-beam 34C—to beam-isolator 28. From here, by means to be discussed later light-beam 34D passes through an optical filter 36; and, a light-beam 34E, traverses a field-stop 44. Emerging light-beam 34F impinges on beam-splitter 38; light-beam portion 34G being directed to tracking apparatus 40, whereas light-beam-portion 34H is directed to data-recovery apparatus 42—tracking apparatus 40 and data-recovery apparatus 42 being designated incoming-light-beam utilizing equipment.

At data-recovery apparatus 42, the modulated information-carrying light-beam portion 34H is then directed to a data pickup tube 56. Here the data on the light-beam is converted to electrical signals that are applied to data receiver 46, and then to a utilization device 48.

DISCUSSION OF LIGHT-BEAM PATHS

Tests have shown it advisable to use a single, coaxial, optical path between the two stations, rather than using two separate—but parallel—optical paths; and the reasons for this may be understood from the following discussion.

Assume that stations A and B are separated by an appreciable distance; and that a light-beam from station A is being directed toward station B; while a light-beam from station B is being simultaneously directed toward station A. If now, station A (or station B) were to move slightly, station A would have to deflect (or "steer") its exiting light-beam in such a manner that its exiting light-beam was still directed at station B; and similar station B would now have to steer its exiting light-beam so that its exiting light-beam was still directed toward station A. This situation requires that each station must have a beam-steering arrangement for its exiting light-beam.

Consider now the light-beam receiving problem at station A. As either station moves, the incoming light-beam from the other station arrives at a different angle; so that station A must have an incoming light-beam beam-steering arrangement that always directs the incoming light-beam to its light-beam receiving apparatus.

A similar situation exists at station B.

Thus, each station requires an exiting light-beam beam-steering arrangement, and an incoming light-beam beam-steering arrangement. Both beam-steering arrangements have similar functions, require similar equipment, need similar driving signals, etc. Moreover, if two separate beam-steering arrangements are used at each station, each must be carefully aligned; and each must "track" the other precisely, to assure optimum operation.

Thus, a "non-coaxial" system (i.e., a system that uses one path for the incoming light-beam and a second path for the outgoing light-beam) requires substantial duplication of equipment, more room, and complex tracking equipment. However, the above-described noncoaxial system has two distinct advantages; namely, (1) the light-beam receiving apparatus and its optical system may be larger than the light-beam transmitting apparatus and its optical system, and (2) there is minimal "crosstalk"—which may be understood from the following discussion.

In the noncoaxial system described above, there is an exiting light-beam and an incoming light-beam; and each light-beam has its own optical system and optical path. Therefore, each optical system may be designed and shielded so that it can not "see" its companion light-beam; that is, light of the exiting light-beam cannot find its way into the incoming light-beam system. Thus, the apparatus that utilizes the incoming light-beam is free of outgoing light-beam signals; i.e., there is no crosstalk. As will be shown later, crosstalk can be a disruptive influence; and the noncoaxial system inherently minimizes the crosstalk problem.

Since the noncoaxial system has its own inherent problems of duplication of equipment, and tracking of its beam-steering arrangements, attention is now directed to a discussion of a coaxial system that is a feature of the described invention (i.e., a system wherein the outgoing light-beam and the incoming light-beam use the same optical path). This system—discussed in connection with FIGURE 1—uses only a single optical system, 32, and a single beam-steering arrangement, 30. In this system the beam-steering arrangement at station A always directs its exiting light-beam from beam-isolator 28 toward station B; and therefore is always aimed at station B, and can receive the incoming light-beam, and direct it to beam-isolator 28.

Similarly, at station B, its light-beam beam-steering arrangement always directs its exiting light-beam toward station A; and therefore is always aimed to receive the incoming light-beam from station A.

Thus, the coaxial system permits the use of a single optical system and a single beam-steering arrangement at each station, for both the exiting light-beam and the incoming light-beam; and obviates the need for tracking two beam-steering arrangements, as required by the noncoaxial system. However, this coaxial system requires a beam-separator for separating the incoming light-beam from the outgoing light-beam.

The coaxial system introduces the problem of crosstalk between the incoming and exiting light-beams; and this problem can be understood from the following discussion. As previously described, in the noncoaxial system, the incoming light-beam and the exiting light-beam are inherently separated; and thus there is minimal crosstalk. However, in the coaxial system, the outgoing light-beam and the incoming light-beam both use the same optical path, and the same optical system. Thus, if some of the exiting light-beam is reflected backwards (back scattered) by dust particles, fog, etc., the backscattered light enters the optical system; and is treated as through it were an incoming light-beam. Similarly, outgoing light may be backscattered by the surfaces of the optical system itself. Moreover, since the exiting light-beam is quite intense, whereas the incoming light-beam may be relatively weak, even a small percentage of backscattered exiting light may be as intense as the incoming light-beam. Thus, modulation of the backscattered exiting light-beam may be erroneously interpreted as an incoming message; i.e., there would be crosstalk between the incoming and outgoing light-beams.

To solve this crosstalk problem, the incoming and outgoing light-beams must be separated and the beam-separation and crosstalk problems of the coaxial system are best solved by causing the exiting light-beam to differ from the incoming light-beam by some characteristic that permits each station to distinguish its exiting light-beam from the incoming light-beam. This distinguishing, or separation can be accomplished in several ways. For example, when using "frequency-separation" the exiting light-beam may have a different color (frequency) than the incoming light-beam. It so happens that many lasers are capable of operating in different modes that produce light of different frequencies, or wavelengths. For example, the well-known helium-neon laser can produce light of 6,328 angstroms and 11,523 angstroms. Therefore, each station may use the same model laser—thus simplifying construction and replacement; but may have its laser operating in a particular mode to produce light of the desired color.

BEAM SEPARATION

This frequency-separation concept may be better understood from FIGURE 1. Here, assume that laser 20 is operating in a mode that produces a light-beam 22A having a given wavelength—say 6,328 angstroms. This light-beam is modulated, and is applied to a beam-separator 28, which—in this case—is a "dichroic" mirror; a dichroic mirror being one that has the property of reflecting light of one color, and transmitting light of another color. A large choice of dichroic mirrors is available, and—in FIGURE 1—dichroic-mirror beam-separator 28 permits light having a wavelength of 6,328 A. to pass through it. Thus, the 6,328 A. light-beam traverses beam-separator 28, beam-steering arrangement 30, and optical system 32; and becomes the exiting light-beam 22E that is directed to station B.

At station B, its laser is operated in such a mode that it produces light having a wavelength of 11,523 A.; and this light-beam is modulated to become the incoming light-beam 34A of FIGURE 1. Here incoming light-beam 34A traverses optical system 32 and beam-steering arrangement 30; and then impinges onto dichroic-mirror beam-separator 28. As indicated above, a dichroic-mirror transmits light of one color (6,328 A. in this case), and reflects light of another color (the incoming 11,523 A. light-beam, in this case).

The dichroic-mirror beam-separator 28 thus reflects incoming 11,523 A. light-beam 34C as light-beam 34D; and directs it to an optical filter 36, which additionally assures that only incoming light-beam 34E of the desired color is applied to the incoming light-beam utilizing apparatus 40 and 42.

This separation of the incoming and exiting light-beams minimizes the possibility of exiting light impinging onto the light-utilizing equipment; and thus minimizes crosstalk.

Moreover, the backscattered light (having a wavelength of 6,328 A.) traverses optical system 32, the dichroic-mirror beam-separator 28, and impinges harmlessly onto the laser; rather than being reflected as crosstalk along with the incoming light-beam to the light-beam utilizing apparatus. It should be noted that since the backscattered light is not a collimated beam, the operation of the optical system is such that only a small portion of the backscattered light actually impinges onto the beam-separator. Thus, using different colored light for the exiting and incoming light-beams permits separation of the incoming and outgoing light-beams, and minimizes crosstalk.

Rather than using a two-color arrangement and a dichroic mirror, the arrangement of FIGURE 2 may be used. Here beam-separator 28A takes the form of an angled mirror having a small aperture. It will be recalled that the modulated outgoing light-beam 22B from laser 20 is inherently a collimated small-diameter beam; and this small-diameter light-beam passes through the mirror aperture, and becomes light-beam 22C; this eventually passing outward through optical system 32. The optical system is of the type that magnifies the diameter of the outgoing light-beam, so that the small-diameter light-beam 22B (typically ⅛ inch in diameter) becomes a larger-diameter outgoing light-beam 22E (typically ⅜ inch in diameter).

The incoming light-beam (34A of FIGURE 1) impinges onto optical-system 32 (which may have a three-inch diameter). Optical system 32 acts as a demagnifier for the incoming light-beam; so that incoming light-beam 34A is reduced to a one-inch diameter light-beam 34B, 34C. Thus, in FIGURE 2, the small-diameter outgoing light-beam 22B, 22C traverses the aperture of beam-separator 28A; and the large-diameter incoming light-beam 34C is reflected as light-beam 34D.

A very small portion of light-beam 34C traverses the aperture; but this merely impinges on the modulator and the laser, and does no harm. In this way, the apertured mirror 28A acts as a beam-separator that separates the incoming and outgoing light-beams. Of course, to further minimize crosstalk, the exiting and incoming light-beams may still have different colors; mirror 28A may be dichroic; and optical filter 36 may still be used—whereupon the backscattered light would be prevented from reaching the incoming light utilizing apparatus.

Crosstalk can also be obviated by using the characteristic of "light-polarization," which is explained and discussed in many books on optics. Broadly stated, the exiting light-beam may have one type of polarization (such as "horizontal" polarization); and the incoming light-beam may have another type of polarization (such as "vertical" polarization). In this case, a polarizing beam-splitter—such as a Rochon prism—is used as the beam-separator. In order to further minimize crosstalk, optical-filter 36 of FIGURE 1 takes the form of a polarizing material (such as Polaroid) that is oriented to permit only the polarization of incoming light-beam 34D to pass therethrough; thus preventing the differently-polarized backscattered light from reaching the data-receiving apparatus 42. The use of polarized light also tends to minimize the effect of ambient background light, since ordinarily background light is not strongly polarized.

BEAM STEERING

As indicated previously, if either station moves, it becomes necessary to steer the exiting light-beam so that it is always directed to the target. This result is readily achieved by use of angularly-positionable mirrors, which may be mounted on devices known as "bender bimorph" units—their structure and operation being illustrated in FIGURES 3*a* and 3*b*. As shown in FIGURE 3*a*, a bender bimorph unit, such as unit 60, is somewhat analagous to a bimetallic thermostat, in that it comprises two strips 62 and 64 (of piezoelectric material, rather than of thermo-responsive material) that are cemented together, and mounted on a support 66. Unit 60 has a mirror 68 affixed to its end, so that an impinging light-beam 70 is reflected from mirror 68 as light-beam 72.

When a suitable voltage is applied to unit 60, as by means of wires 74 and 76, one piezoelectric strip expands while the other piezoelectric strip contracts, so that unit 60 takes a curved form—as shown in FIGURE 3*b*. As may be seen, the deformed bender bimorph unit 60 now directs impinging light-beam 70 through an increased angle; so that the reflected light-beam 78 has been "steered" to another direction.

A voltage of a different polarity would cause the bender bimorph unit 60 to curve in the opposite direction, so that the impinging light-beam 70 is steered through a smaller angle. Various bender bimorphs, voltages, polarities and magnitudes may be used to achieve desired "beam-steering." In this way, unit 60 acts as a beam-steerer that can steer a light-beam in various directions, depending upon the steering electrical signals and the orientation and characteristics of the bender bimorph. These bimorphs, their electrical connections, construction, characteristics, etc., are described in a number of publications, such as "Piezoelectric Ceramic Transducers," Bulletin H200b, issued by Gulton Industries, of Metuchen, N.J.

FIGURE 4 illustrates a beam-steering arrangement 30 comprising two bender-bimorph units 60V and 60H; the letters "V" and "H" indicating that those particular units are oriented to steer the light-beam vertically and horizontally respectively. Assume first that an outgoing light-beam 22C is aimed at a target station, and follows the solid-line path. If either station were to move horizontally, suitable electrical steering signals deform beam-steering unit 60H; and the outgoing light-beam 22D would be steered horizontally, as indicated by the dashed light-beam path. If on the other hand, either station were to move vertically, suitable steering signals deform unit 60V; and the outgoing light-beam 22D would be steered vertically, as indicated by the dotted light-beam path. Similarly, in case of a diagonal movement by either station, both units 60H and 60V would be deformed; and the outgoing light-beam 22D would be steered in a diagonal direction.

It is apparent that if unit 30 of FIGURE 4 were at station A, and if target station B moved diagonally, suitable steering signals would deform beam-steerers 60V and 60H so that outgoing light-beam 22D would illuminate the target. Simultaneously, the beam steering arrangement at target station B would also be suitably deformed, so that its exiting light-beam would be steered to station A; in fact, in FIGURE 4 the light-beam from station B would follow the same optical path (reversed direction, of course) as the exiting light-beam from station A. Thus, the light-beam from station B would become the incoming light-beam at station A; and would be reflected by beam-steerers 60V and 60H in such a manner that it would leave arrangement 30 along the same path as light-beam 22C enters arrangement 30.

Thus, referring back to FIGURE 1, beam-steering arrangement 30 directs an outgoing light-beam from beam-separator 28 to the target; and simultaneously directs the incoming light beam to beam-separator 28—the beam-separator then directing the incoming light-beam, as beam 34D, to light-beam utilizing equipment. It is the use of a single beam-steering arrangement 30 and a single optical system 32 that gives the coaxial system its advantage.

It should be noted that FIGURE 4 shows a beam-steering arrangement 30 wherein the incoming and outgoing light-beams are substantially coaxial; whereas the schematic drawing of FIGURE 1 shows these beams to be substantially prependicular. The angled result is obtained—where desirable—by the use of secondary angled mirrors, or by repositioning units 60 at an angle to their impinging light-beam.

LIGHT-BEAM UTILIZATION

Referring again to FIGURE 1, in accordance with the previous discussion the incoming light-beam passes thru optical filter 36, which acts to remove the backscattered light from light-beam 34E; and traverses a field-stop 44—which will be more fully discussed later. At this point, light-beam 34E contains two types of information; namely (1) information—in the form of modulation—that is to be communicated; and (2) information—in the form of reception angle—about the position, and movements, of the target station. It is desirable to separately process each type of information; so the emergent light-beam 34F is applied to a beam-splitter 38 that produces two light-beams 34G and 34H—each light-beam containing both types of information. In FIGURE 1, it will be seen that beam-splitter 38 directs light-beam 34G to tracking apparatus 40 comprising a tracking tube 52, and also directs light-beam 34H to data-recovery apparatus 42 comprising a data pickup tube 56. Thus data-light-beam 34H impinges upon receiver-pickup tube 56 in the same manner as tracking-light-beam 34G impinges upon tracking tube 52. Suitable circuitry, to be described later, assures that tracking light-beam 34G continuously impinges onto tracking-tube 52, and thus assures that data light-beam 34H continuously impinges upon the receiver-photocell 56.

TRACKING

Consider now the utilization of the target-movement information contained in the incoming light-beam 34A; and assume first that station A is looking directly at target station B, and that the units 60 of beam-steering arrangement 30 are at their quiescent central positions. Under these conditions, beam-splitter 38 of FIGURE 1 directs light-beam 34G to the center of tracking tube 52.

A large variety of tracking tubes are well known, and commercially available. For example, model FW–118 tracking tube is available from the International Telephone and Telegraph Industrial Laboratory, Fort Wayne, Ind.; and a description of the tracking tube, its operation, and its associated circuitry appears in "Electronics," Sept. 30, 1960, pp. 88–91. Another, newly-developed tracking tube, model F4002, is available from the same laboratory.

Generally speaking, these tracking tubes comprise a photoemissive faceplate that produces electrons when light impinges on the faceplate. Under the assumed conditions, light-beam 34G impinges on the center of the tracking tube's faceplate, and produces an internal axial stream of electrons. Associated tracking circuitry 54, designed for use with the tracking tube, and described in the above Electronics article, indicates that the light-beam is centrally positioned.

Assume now that the target, or the home station, moves slightly. As a result, the incoming light-beam 34A now impinges onto optical system 32 at a somewhat different angle; and traverses optical system 32, beam-steering arrangement 30, beam-separator 28, and beam-splitter 38; and impinges onto the faceplate of tracking tube 52 at an off-center location. The resultant off-center stream of electrons in the tracking tube causes its associated tracking circuitry 54 to produce a tracking error-signal indicative of the amount and direction of the off-center light-beam 34G. This error-signal is processed in a manner to be described later, and is applied as a corrective steering-signal to the elements of beam-steering arrangement 30.

Suppose, for example, that the target station had moved to the right. The resultant horizontal steering-signal is applied to horizontal beam-steering unit 60H, which is deformed in such a manner that light-beam 34G again impinges on the center of the tracking tube faceplate. This new condition terminates the error-signal. A similar operation would occur if the target station moved to the left; or if the home station moved.

In those cases where the movements were vertical, a vertical error-signal is produced; and a corresponding steering-signal is applied to the vertical beam-steerer 60V of beam-steering arrangement 30. In a manner similar to that described above, vertical beam-steerer is deformed in such a manner that light-beam 34G is moved to impinge onto the center of the tracking tube's faceplate; and the vertical error-signal is terminated. Diagonal movement, such as would occur in space communication, is detected and treated in a similar way.

It is apparent that a beam-steerer can deform only a given amount, and is thus limited in its tracking ability; presently-available bender-bimorph beam-steers having a limit somewhat greater than four degrees. Greater beam-steering angles are achieved by applying the steering-signals to motors that reposition the platform on which the optical portion of the system is mounted.

It has been found that the above described tracking system can maintain communication with a target station that oscillates at a rate as high as 50 cycles per second, or moves at a rate that—taken in conjunction with the distance to the home station—is the equivalent of a 50-cycle per second change. Moreover, it has been found that air turbulence—particularly that caused by rising heated air—produces the equivalent of target oscillation; and the above-described tracking system has compensated for the perturbances produced by air turbulence.

It will be recalled that the error signals from tracking circuitry 54 of FIGURE 1 produce steering-signals that are applied to the beam-steering units in order to recenter light-beam 34G on the tracking tube 52; and that the steering-signals are terminated when the recentering operation is completed. The termination of the steering-signals would permit the beam-steering units to return to their quiescent positions, which would permit the light-beam 34G to move from its central position on the tracking-tube faceplate, etc. In order to overcome this situation, the horizontal error-signals from tracking circuit 54 are applied to a horizontal error-signal integrator 82, which holds the latest horizontal error-signal; and continually applies the resultant steering-signal to the horizontal beam-steerer unit 60H. In this way, unit 60H is held at given distortion, thus centering the light-beam until further horizontal movement of either station produces a new horizontal error-signal—which is then stored in integrator 82, and causes a new steering-signal to be applied to unit 60H, as explained above.

In a similar manner, the vertical error signals from tracking circuitry 54 are applied to a vertical error-signal integrator 84, which also operates in the above-described manner. Thus, any station movement appears in the incoming light-beam; and produces error-signals that cause the beam-steering arrangement to compensate for the movement.

DATA RECOVERY

Consider now the modulated information. To recover this information, light-beam 34H impinges onto data-pickup photocell 56, which converts data-light-beam 34H into electrical data-signals for data-receiver 46. In order to continually receive the desired data, data-light-beam 34H must continuously impinge on photocell 56; i.e., if the data-light-beam 34H moves off the photocell, no data is received.

As previously indicated, the incoming light-beam is to be modulated with the information it is desired to transmit; and equipment has been built to simultaneously transmit video and aural information on a single light-beam. Various types of light modulators have been used, including the North American Aviation Inc. model AM4 Optical Modulator, and the Sylvania Electronic System model S2A Amplitude Modulator.

Depending upon the way the light-beam has been modulated (amplitude, frequency, phase, pulse, etc.) a suitable data-receiver (46 of FIGURE 1), demodulates the light-beam; and passes the demodulated data-signals to utilization device 48. For example, if the light-beam had been amplitude-modulated, data pickup tube 56 converts the varying amplitude of the light-beam into a corresponding varying-amplitude data-signal; and this is applied to data receiver 46.

The tracking tube 52 and the pickup tube 56 are carefully positioned with respect to their light-beams; so that, as a result, when tracking light-beam 34G is centered on the tracking tube 52, data light-beam 34H is centered on its pickup tube 56. Thus, as the tracking arrangement operates to continuously center light-beam 34F on the tracking tube, the same operation automatically centers light-beam 34H on the pickup tube. In this way, the incoming data is continuously applied to the pickup tube; regardless of the movements of the stations.

ACQUISITION

In order for the two stations to communicate with each other as described above, they must be locked on to each other's light-beams; and the above-described tracking systems accomplish this result. However, in order to initially lock on, a searching or "acquisition" operation is necessary; and this is achieved as follows. Initially, each station is aimed roughly at the other station by means such as a telescope sighting, radar, computer readout, etc.; and then an automatic acquisition operation is performed. One such acquisition operation will now be described.

A slight digression is necessary at this point in order to define a few new terms. Referring back to FIGURE 1, it will be recalled that the laser produces a light-beam that is directed to the target station. When the home station is initially aimed at the target station, say by means of a telescope, the crosshairs of the telescope should be centered on the target station's optical system, and—ideally—the home station's exiting light-beam should then illuminate the target station's optical system. Unfortunately, because of mechanical and alignment problems, this desideratum is not often attained; but the home station's exiting light-beam does illuminate part of the target area—i.e., an area that contains the target station. Similarly, the target station's exiting beam also illuminates a part of the home station's area. In order for each station to "acquire" the other, each station must (1) illuminate the other's optical system, and (2) each station's optical system must receive, or "see" the light-beam from the other station; it will be shown later that these conditions must be satisfied simultaneously. As indicated previously, each station can receive the beam from the other station only when it is aimed at the other station, so that the latter can receive the beam from the first station.

FIGURE 5 illustrates one acquisition sequence. As a result of telescopic aiming at station B, station A is known to be within an area 90, designated as A's uncertainty area, or target area. Area 90 is divided, for convenience of explanation, into sixty-four cells 92; and station A is asumed to be in cell (90–27), e.g., cell number 27 of area 90. By means of telescopic sightings, station B is also known to be within an uncertainty area 94 that is also divided, for convenience of explanation, into sixty-four cells; and is assumed to be in cell number (94–60).

In operation, at station A suitable electrical signals are applied to its beam-steering units, so that its exiting light-beam scans out a series of parallel horizontal lines; this scanning pattern being widely used in television, and being known as a "raster scan."

Electrical waveforms for producing a raster scan are well known, and comprise "horizontal" and "vertical" deflection waveforms; examples of which are shown in FIGURE 6. Each individual "tooth" of sawtooth waveform 96 represents a voltage that, when applied to the horizontal beam-steering unit (60H of FIGURE 4), steers the exiting light-beam gradually in the horizontal direction; and, when the exiting light-beam has been steered through a predetermined angle, rapidly returns it to its original position; whereas staircase waveform 98, when applied to the horizontal beam-steering unit, causes the exiting light-beam to move stepwise in the horizontal direction through a predetermined angle, and to then rapidly return to its original position. Sawtooth waveform 96 causes the light-beam to move continuously across the cells, whereas staircase waveform 98 causes the light-beam to dwell momentarily on each cell.

Waveform 100, of FIGURE 6, is a long-duration sawtooth waveform, and—when applied to the vertical beam-steering unit (60V of FIGURE 4)—steers the exiting light-beam gradually in a vertical direction. At the end of the long-duration tooth, the exiting light-beam is rapidly returned to its original position. Similarly, when waveform 102 of FIGURE 6 is applied to the vertical beam-steering unit, it steers the exiting light-beam in a vertical direction—but in a stepwise manner.

A scan generator 108 provides the necessary electrical signals, and when the first tooth I of waveform 96 is applied to the horizontal beam-steerer, and waveform 100 is applied to the vertical beam-steerer, the exiting light-beam moves horizontally at a rapid rate, and vertically at a slow rate; the overall effect being a slightly-upward diagonal movement of the exiting light-beam. The next tooth II of waveform 96 produces a second, vertically displaced, parallel diagonal movement. The next six subsequential teeth of waveform 96 produce similar parallel lines; so that a set of eight scanning lines have been produced. At the end of the eighth tooth VII of waveform 96, waveform 100 has finished its first tooth, and the scanning process is repeated. By suitably orienting the beam-steering arrangement 30, the scanning lines may be made horizontal, rather than diagonal. Thus, by use of the above scanning waveforms 96 and 100, the exiting light-beam searches the target area in an attempt to acquire the target.

The use of staircase waveforms 98 and 102 produces a similar scanning pattern, except that the exiting light-beam moves in a stepwise manner, rather than moving gradually.

Referring back to FIGURE 5, station A scans rapidly; and, during its first complete fast raster scan (known as a "frame"), its exiting light-beam sequentially illuminates cells (94–1), (94–2), (94–3) . . . (94–64) until it has illuminated every cell in uncertainty area 94. Station B also uses a raster scan; but scans at a much slower rate, as will be explained later, so that its frame-time is longer than the frame-time of station A.

Referring again to FIGURE 5, during the first station-A complete raster scan, station B's exiting light-beam illuminates only cell (90–1) of A's uncertainty area 90. Since B's exiting beam does not illuminate A, the beam of the latter is not within the receiving pattern of B, and B cannot receive the exiting beam from A at any time during the scan of A. During station A's second fast complete scan, it again illuminates the entire area 94; but station B illuminates only cell (90–2) etc. This procedure is followed until station B has illuminated every cell in area 90; whereupon the operation is repeated.

With the above scanning sequence in mind, consider the first step of the acquisition operation. Station B is illuminating cell (90–1), and station A sequentially illuminates all cells of area 94. Since station A is at cell (90–27), and station B illuminates only cell (90–1), station A does not receive station B's illumination, i.e., does not "see" station B. Similarly, when station A illuminates station B's location at cell (94–60), station B is looking at cell (90–1); so neither station sees the other.

Consider now the second step of the acquisition operation. Station B now illuminates cell (90–2), and station A sequentially illuminates all the cells of area 94. Since station A is still at cell (90–27), and station B illuminates only cell (90–1), station A does not see station B; and station B does not see station A.

However, at the twenty-seventh step of the acquisition sequence, station A, which is at cell (90–27), is being illuminated by station B; so that station A "sees" station B when A is pointed at B. Station A's exiting light-beam eventually illuminates cell (94–60), where station B is located; so that station B sees station A. At this instant each station illuminates, and sees the other. As a result, the optical system of each receives an incoming light-beam from the other station; this light-beam impinging onto the tracking tube; which, in a manner to be described later, thereupon terminates the acquisition operation—and switches to the previously-described tracking operation.

It may thus be seen that regardless of inaccuracies in the initial telescopic aiming, as long as the target station is in a predetermined uncertainty area, acquisition can be achieved.

While the foregoing explanation has been presented in terms of an eight-cell by eight-cell uncertainty area, it has been found that the uncertainty areas may have different sizes and shapes, may be divided into any convenient number of cells, and may use various scan patterns. For example, the uncertainty areas may be rectangular, triangular, circular, etc.; and the two uncertainty areas may have different shapes, sizes, and number of cells. Moreover, it is not necessary that the acquisition sequence start at cell number one; it may start anywhere, and may start at different cells in the different uncertainty areas. Furthermore, the operations of the two stations do not have to be synchronized; i.e., it may happen that for the first step, a cell—other than cell number one—may be illuminated. However, after a series of steps, each cell will have been illuminated, as though a sequential acquisition process had been used.

It will be recalled that during the acquisition operation, station A of FIGURE 1 does not receive an incoming light-beam until it sees its target station. Therefore, before the actual acquisition, station A does not receive an incoming light-beam; and its tracking tube 52 of FIGURE 1 is unilluminated. As a result, tracking tube 52 does not produce any output signal; no error-signals or steering-signals are produced; and a flip-flop 106 assumes a given state that energizes scan generator 108 to produce scanning waveforms of the type discussed in connection with FIGURE 6.

At actual acquisition, both stations receive an incoming light-beam, which—as shown in FIGURE 1—is directed to tracking tube 52. This tube now produces an output-signal that achieves two results. Firstly, this output signal resets flip-flop 106 to disable scan generator 108, so that the acquisition scanning pattern is terminated; and secondly, the output signal causes the tracking circuitry to produce error signals. Thus, each station performs an acquisition operation, and when a target station is acquired, switches to a tracking mode of operation.

Under some conditions, such as a dense drifting fog or the flight of a bird, the optical communication path may be temporarily blocked. At this time, the absence of an impinging light-beam at tracking-tube 52 would cause the system to switch from a tracking mode of operation to an acquisition mode of operation. However, since the interruption may be temporary, flip-flop circuit 106 has a delay interval (typically three seconds) before it changes state. Thus, momentary light-beam interruptions do not cause a communications disruption in the form of an unnecessary acquisition interval.

It will be understood that during the acquisition operation, no light-beam is being received; and therefore no data is being presented to the information receiver. It will also be noted that the scanning signals and the tracking signals from scan generator 108 are applied thru operational amplifiers 110 and 112 to the beam-steering arrangement 30; the operational amplifiers acting as adders that combine the available signals from tracking circuitry 54 to form suitable steering-signals.

It is known that the quiescent position of a beam-steerer depends upon its construction, the materials used, the mirror mounting, the mounting of the unit, and other factors. As a result, its quiescent position may not be the position that produces an axial light-beam. In order to correct this situation, suitable electrical positioning-signals are produced by D.C. level circuit 114, and are applied to the beam-steerers, in this way assuring that an axial light-beam is produced under no-error-signal conditions.

TRACKING OPERATION

While numerous tracking tubes are available, the newly introduced Quadrant Multiplier Phototube, model F4002 made by ITT, has many attractive characteristics. As indicated in FIGURE 7, its photoemissive faceplate 120 is divided into four quadrants 122, 124, 126 and 128. If an off-axis light-beam impinges onto the upper-left quadrant, 122, the photo-electrons from that quadrant are directed to a multiplier section; and a signal appears at a quadrant-terminal 130 of the tube. Similarly, if a light-beam impinges onto upper-right quadrant 124, a signal appears at quadrant-terminal 132. A similar relation exists between lower-right quadrant 126 and terminal 134, and between lower-left quadrant 128 and terminal 136.

FIGURE 8 shows a schematic representation of this tube and associated circuitry. Here the four quadrant terminals 130, 132, 134, and 136 associated with respective quadrants of the tube, are interconnected by coupling networks 140, 142, 144, 146, and 148. Turning attention first to coupling network 140, it may be seen that this comprises a center-tapped resistance having its output wire connected as one input to a vertical differential amplifier 150, whose output is appled to vertical error-signal integrator 84 that was discussed previously. Coupling network 144 also comprises a center-tapped resistance having its output wire connected as another input to vertical differential amplifier 150. Coupling networks 142 and 146 are similarly constructed, and similarly connected to a horizontal differential amplifier 152, whose output is applied to the previously-discussed horizontal error-signal integrator 82.

The tracking mode of this tube operates as follows. Assume that the incoming light-beam impinges onto the very center of the tube's faceplate, and produces an axial stream of photoelectrons. These are divided equally among the four quadrants, and each quadrant-terminal 130, 132, 134, and 136 produces an equal signal. Coupling networks 140 and 144 therefore apply equal signals to vertical differential amplifier 150, which—since its input is equal—does not produce any error-signal. In a similar manner, coupling networks 142 and 146 also apply equal signals to horizontal differential amplifier 152, which—because of its equal input signals—does not produce any error-signal. Thus, for a centrally-impinging light-beam, no error-signals are produced; no beam-steering signals are produced; and the bender-bimorph beam-steerers are permitted to maintain their existent state.

Assume now that movement of one of the stations cause the impinging light-beam to move horizontally so that it impinges at point 154 of FIGURE 7. Under this condition, the photoelectrons are divided between quadrants 124 and 126; and only quadrant-terminals 132 and 134 produce output signals, these being equal. Referring now to FIGURE 8, tracking network 142—having equal signals applied to both ends thereof, applies a signal to horizontal amplifier 152. However, network 146 does not have any signals applied to it, and therefore it does not apply any signal to amplifier 152. Since a differential amplifier produces an output signal corresponding to the difference of its input signals, differential amplifier 152 produces an error-signal having a polarity that indicates the light-beam has moved to the right; this rightward error-signal being integrated in circuit 82, and being applied as a steering-signal to the horizontal beam-steerer (60H of FIGURE 4). This beam-steerer is correspondingly distorted, so that the light-beam is steered back to the center of faceplate 120; whereupon the error-signal disappears. However, integrator 82 maintains the necessary value to maintain the beam-steerer distortion. As the stored voltage leaks off integrator 82, the horizontal beam-steerer 60H returns to its quiescent position, and the light-beam impingement point on the faceplate of the tracking tube again moves off center, producing error and steering signals as explained above. The voltage-leakage rate is designed to help achieve the desired tracking rate. It should be noted that this quadrant tube does not produce error-signals that are proportional to the displacement of the impingement point; but the integrator compensates for this, by producing large steering-signals for long-duration, small error-signals.

Returning to FIGURE 8, it will be recalled that the rightward movement of the impingement point produces output signals at quadrant-terminals 132 and 134, but does not produce signals at quadrant-terminal 130 or 136. Thus, tracking networks 140 and 144 produce equal output signals that are applied to vertical differential amplifier 150; but, since the input signals to differential amplifier 150 are equal, no vertical error-signal is produced; and no vertical steering-signal is applied to the beam-steerer.

It is apparent that leftward motion of the impingement point produces similar results, except that the error-signal has an opposite polarity, which causes the integrator to produce an opposite polarity steering-signal that distorts the beam-steerer in the opposite direction. Thus, horizontal movement of the light-beam impingement point produces compensating horizontal beam-steering signals. It will be obvious that vertical movement of the light-beam impingement point will produce corresponding compensating vertical beam-steering signals.

Assume now that the light-beam impingement has moved to point 156 of FIGURE 7. Under this condition, only quadrant-terminal 130 will produce a signal. Referring to FIGURE 8, it will be seen that the signal at terminal 130 will cause networks 140 and 146 to apply input signals to amplifiers 150 and 152; and these, in turn, will produce compensating horizontal and vertical error-signals that result in suitable compensating horizontal and vertical steering-signals. Thus, any movement of the light-beam impingement point produces compensating steering signals.

DATA RECOVERY

The quadrant tracking tube is also capable of producing data signals, and can thus eliminate the data pickup tube previously discussed. This result is achieved by network 148 of FIGURE 8. It will be recalled that the light-beam impingement produces a signal at the quadrant-terminal associated with the impingement quadrant. Therefore, in accordance with the quadrant the light-beam impinges upon, one or more of the quadrant terminals produces an output signal. To take advantage of this, data-network 148 sums these signals, and applies a data-signal to information receiver 46.

It will be recalled that the incoming light-beam has been modulated in accordance with desired data; and if this is amplitude-modulation, the modulation varies the intensity of the photoelectron beam, and thus the magnitude of the signals at the quadrant terminals; and appears as a varying magnitude signal applied to information receiver 46.

Thus, by summing the signals from the four quadrants, the data signal is equal to the instantaneous intensity of the light-beam, and is independent of tracking information—thus eliminating tracking crosstalk. The modulation of the light-beam is at relatively high frequencies that do not effect the tracking circuitry, or may be filtered therefrom; and the tracking circuitry has a low-frequency response that does not pick up the modulations—so that there is no crosstalk.

MISCELLANEOUS

One acquisition system has been described, but others may of course be used. An alternate acquisition system uses a retro-reflector, such as a corner reflector, mounted adjacent the optical system of each station. In use, the home station scans the target area with its exiting light-beam; and when the light-beam impringes upon the retro-reflector associated with the target station, the light-beam is reflected back to the home station.

In this case, the reflected light-beam has characteristics similar to the exiting light-beam; but must be distinguished therefrom. This separation is most readily achieved by polarizing the exiting beam.

Referring to FIGURE 9, a retroreflector assembly 160 is mounted adjacent to, and aimed in the same direction as, the optical system of the station. Assume that the exiting light-beam 22E from the home station is scanning as previously described; and, at a given instant impinges on assembly 160. Light-beam 22E is assumed to be horizontally polarized, this being indicated in the conventional manner by means of dots associated with light-beam 22E. Retroreflector assembly 160 comprises a quarter-wave plate 162 and a corner-reflector 164. When the horizontally-polarized light-beam 22E traverses plate 162 and is reflected by the corner reflector 164, the emerging light-beam 166 is vertically polarized—this being indicated in the conventional manner by means of the short vertical lines associated with light-beam 166. Thus, the horizontally-polarized exiting light-beam of the home station has been converted to a vertically-polarized incoming light-beam; and the previously-described beam-separator and optical filters can now segregate the back-scattered light, the incoming light-beam and the exiting light-beam. It should be noted that if the exiting light-beam had been vertically-polarized, the retroreflector assembly 160 would have converted it to a horizontally-polarized light-beam so that, in this case too, the equipment is able to separate the backscattered light, the exiting light-beam, and the incoming light-beam.

Another acquisition system divides the target area into a smaller number of cells, typically a four-cell by four-cell array; and scans this array as in a manner similar to that described above. In this acquisition system, field stop 44 of FIGURE 1 is opened at the target station B, so that the resultant larger-diameter light-beam 34F permits target-station B at cell 94–60 to "see" station A's light-beam when the light-beam impinges onto adjacent cells such as 94–51, 94–52, 94–53, 94–59, and 94–61 (FIGURE 5). Thus, by suitably opening the field-stop, the eight-cell by eight-cell target area may be divided into four four-cell by four-cell areas, and scanned by suitably-formed scanning waveforms.

In use, station A scans at its usual fast rate; but, station B—rather than seeing station A's light-beam at the sixtieth scansion—now sees it at the seventh scansion, when it impinges onto cells 94–51, 94–52, and 94–53. At this time, flip-flop circuit 106 of FIGURE 1 produces a first output signal that closes field stop 44 to its original size. This has the effect of reconverting the target area to an eight-cell by eight-cell matrix; and the originally-described acquisition procedure is initiated. Thus, this acquisition system accelerates the searching process to an appreciable degree.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. A station for a two-way optical communication system, comprising:

a light source;

a beam-separator;

means for causing light from said light-source to impinge on said beam separator, and to become the exiting data-bearing light-beam of said station; and means for causing an incoming light-beam, having at least transverse target-station-position data thereon, to impinge on said beam-separator, and to be directed to incoming-light-beam utilizing equipment.

2. The combination of claim 1 wherein said beam-separator is an apertured mirror, one of said light-beams being a small-diameter light-beam that traverses the aperture of said mirror, and the other of said light-beams being a larger-diameter light-beam that is reflected by said apertured mirror.

3. The combination of claim 1 wherein said beam-separator is a dichroic mirror, one of said light-beams being of a color that traverses said dichroic mirror, and the other of said light-beams being of another color that is reflected by said dichroic mirror.

4. The combination of claim 3 including an optical-filter positioned in the path of said incoming light-beam between said beam-separator and said incoming-light-beam utilizing equipment, said optical filter passing only the color of light of said incoming light-beam.

5. The combination of claim 1 wherein said beam-separator is a polarizing beam-splitter, and one of said light-beams has a polarization that has given path through said polarizing beam-splitter, and the other of said light-beams has a different polarization that has a different path through said polarizing beam splitter.

6. The combination of claim 5 including an optical-filter positioned in the path of said incoming light-beam between said beam-separator and said incoming-light-beam utilizing equipment, said optical filter passing only the polarization of light of said incoming light-beam.

7. The combination of claim 1 wherein said incoming light-beam and said exiting light-beams are axial light-beams, and have a common optical axis; wherein said light-beam utilizing equipment comprises tracking apparatus for producing tracking error-signals based on the angle of said incoming light-beam referenced to said common axis, and said light-beam utilizing equipment further comprises data-recovery apparatus for producing data signals.

8. The combination of claim 7 including means—comprising a beam-splitter positioned in the path of said incoming light-beam between said beam-separator and said incoming-light-beam utilizing equipment—for directing one light-beam from said beam-splitter to said tracking apparatus for producing tracking error-signals, and for directing another light-beam from said beam-splitter to said data-recovery apparatus for producing data-signals.

9. The combination of claim 7 including electrooptical beam-steering means for steering said common optical axis of the incoming and existing light-beams toward a target station; and means for causing said tracking error-signals to control the operation of said beam-steering means.

10. The combination of claim 9 including a scanning generator for producing scanning waveforms; and means for applying said scanning waveforms to said electrooptical beam-steering means for causing the exiting light-beam to scan a target-area in a predetermined manner.

11. The combination of claim 1, including:

a data source;

means for modulating the output of said data source onto the light from said light source;

said beam-separator comprising an apertured mirror;

means for directing said modulated exiting light-beam through the aperture of said mirror;

an electrooptical beam-steering arrangement having a horizontal beam-steering unit and a vertical beam-steering unit;

means for directing said modulated light-beam from the aperture of said mirror to said beam-steering units, for causing said exiting light-beam to be steered in accordance with the position of said beam-steering units;

an optical system; and means for directing the light-beam from said beam-steering arrangement through said optical system, for producing an exiting data-bearing light-beam that is steered toward a target station.

12. The combination of claim 11 including:

means for causing said station to search for a target station, said searching means comprising a scan-waveform generator and means for applying the scan waveforms to respective said electrooptical beam-steering units for causing the exiting light-beam to scan the target area in a search pattern.

13. The combination of claim 1, wherein said last means comprises a beam-steering arrangement having a horizontal beam-steering unit and a vertical beam-steering unit;

an optical filter, positioned in the path of said incoming light-beam just prior to said incoming light-beam utilizing equipment, adapted to transmit only light having the characteristics of said incoming light-beam—whereby said incoming light-beam traverses said beam-steering arrangement, to be directed from said beam-separator through said optical filter, and impinges onto said incoming light-beam utilizing means; and means for causing said light-beam utilizing means to produce tracking output signals indicative of the relative position of the target station producing said incoming light-beam.

14. The combination of claim 13 including means for causing said light-beam utilizing means to produce data-bearing electrical signals.

15. The combination of claim 13 wherein said output-signal producing means comprises a tracking tube;

electronic means for causing said tracking output-signals to terminate the station's search mode of operation, and to initiate the station's tracking mode of operation;

electronic means for converting said output-signals into horizontal and vertical steering signals; and means for applying said steering signals to respective said electrooptical beam-steering units.

16. The combination of claim 1, including:

a data source;

means for modulating the output of said data source onto the light from said light source;

said beam-separator comprising an apertured mirror;

means for directing said modulated exiting light-beam through the aperture of said mirror;

a beam-steering arrangement having a horizontal beam-steering unit and a vertical beam-steering unit;

means for directing said modulated light-beam from the aperture of said mirror to said beam-steering units, for causing said exiting light-beam to be steered in accordance with the position of said beam-steering units;

an optical system;

means for directing the light-beam from said beam-steering arrangement through said optical system, for producing an exiting data-bearing light-beam that is steered toward a target station;

means for causing said output signals to terminate the station's search mode of operation, and to initiate the station's tracking mode of operation;

means for converting said output signals into horizontal and vertical steering signals;

means for applying said steering signals to respective said beam-steering units;

means for causing said station to search for a target station, said searching means comprising a scan-waveform generator and means for applying the scan waveforms to respective said beam-steering units for causing the exiting light-beam to scan the target area in a search pattern;

an optical filter, positioned in the path of said incoming light-beam just prior to said incoming light-beam utilizing equipment, adapted to transmit only light having the characteristics of said incoming light-beam—whereby said incoming light-beam traverses said beam-steering arrangement, to be directed from said beam-separator through said optical filter, and impinges onto said incoming light-beam utilizing means;

means for causing said light-beam utilizing means to produce tracking output signals indicative of the relative position of the target station producing said incoming light-beam, said means comprising a tracking tube;

means for causing said light-beam utilizing means to produce output signals corresponding to the communication data on said incoming light-beam; and means for recovering the data on said output signals.

17. The combination of claim 1 including scan-waveform generator means for producing scanning-waveforms; and means for causing said scanning-waveforms to scan said exiting light-beam across a target area in a predetermined manner.

18. A communication system utilizing a narrow information-bearing optical beam, comprising:

first and second stations each capable of transmitting and receiving such an optical beam;

means, comprising electrooptical beam-steerers and scan-waveforms applied to said beam-steerers, for causing the exiting beam from said first station to scan in a first scan-pattern, a first target area containing said second station—whereby said beam will illuminate said second station;

means, comprising electrooptical beam-steerers and scan-waveforms applied to said beam-steerers, for causing the exiting beam from said second station to scan in a second scan-pattern, a second target area containing said first station—whereby said beam will illuminate said first station; and detection means for producing output signals when each said station is simultaneously illuminated by the other station.

19. The combination of claim 18 wherein said first scan-pattern has a given frame-time, and said second scan-pattern has a frame-time considerably greater than said first frame time, said second area including a number of area cells, and said second station's beam illuminating each of said cells during said second frame time for a period not substantially less than said first frame time.

20. The combination of claim 18 including a retro-reflector at one station, and a quarter-wave plate positioned in front of said retro-reflector—whereby a beam of a particular polarization transmitted by the other station is reflected back to that station with a different polarization.

21. The combination of claim 18 wherein said target-areas are two-dimensional cell-type arrangements; said scan patterns cause said narrow lightbeams to scan said two-dimensional target-areas in a cell-by-cell manner; and means for causing said light-beams to comprise orthogonal movements of each said light-beam.

22. The combination of claim 21 wherein said scan-patterns are of the raster-type, and are produced by applying waveforms of the type shown in FIGURE 6 to said electrooptical beam-steerers; and wherein the ratio of scan-speeds is substantially equal to the number of cells in said target-area.

23. The combination of claim 18 wherein said detection means comprises reception means for receiving the beam from the other station, said reception means having a flip-flop controlled optical arrangement for controlling the reception pattern of the station.

24. The combination of claim 23 including means for causing a station's reception pattern is substantially identical with the station's transmitting pattern.

25. The combination of claim 23 including means for causing a station's reception pattern to be different from the station's transmitting pattern.

26. The combination of claim 23 wherein a station's reception pattern may be varied relative to the station's transmitting pattern, said varying being controlled by a variable-aperture field-stop positioned in the path of the received light-beam.

27. The combination of claim 26 including tracking-tube means for producing said output signal indicating simultaneous illumination of the two stations, and means for causing said output signal to control the aperture of said variable-aperture field-stop.

28. An optical communication system comprising:

a first station and a second station, defining a common optical axis from one station to the other station;

each station having means for producing an exiting light-beam, and having means for steering said exiting light-beam along said common optical axis;

each station having an optical system positioned on said optical axis, each said optical system adapted to transmit said exiting light-beam along said common optical axis from said target station, the exiting and incoming light-beams of the stations travelling along said common optical axis to define a coaxial optical communication system;

said light-beam steering means also being adapted for directing the incoming light-beam from said common optical axis to incoming light-beam utilizing apparatus.

29. The combination of claim 28 including an apertured-mirror beam-separator means—positioned in the common optical path of said exiting beam and said incoming beam—for passing said light-beam through said aperture to said optical system, and passing said incoming light-beam to said incoming light-beam receiving apparatus.

30. The combination of claim 28 including:

means for causing each station to search for the other station, said means comprising electrooptical beam-steering means, waveform-generating means, and means for applying said waveforms to said electrooptical beam-steering means; and means for producing an acquisition-signal when the other station has been found.

31. The combination of claim 30 including:

means for causing the acquisition-signal to disable said waveform-generating means to thus terminate the search mode of operation; and means for causing the acquisition-signal to initiate a tracking mode of operation.

32. The combination of claim 30 wherein each searching means comprises a scan-waveform generator;

means for applying the scan-waveform at one station to that station's electrooptical beam-steering means for causing that station's exiting light-beam to rapid-scan its target area; and means for applying the scan-waveform at the other station to said other station's electrooptical beam-steering means for causing said other station's exiting light-beam to slow-scan its target area—whereby when the exiting light-beams of said stations simultaneously impinge on their target stations, each station produces an acquisition-signal.

33. The combination of claim 32 wherein each station has a single tracking tube requiring the impingement of a single light-beam thereon, and said simultaneous impingement causes the incoming light-beam at each station to impinge on that station's tracking tube, the output of said tracking tubes forming said acquisition signals.

34. The combination of claim 33 wherein, when said searching mode of operation is terminated, the output of said single tracking tubes form tracking signals; and
means for applying said tracking signals to said beam-steering means for continuously steering the exiting light-beam at each station to that station's target station, and for continuously directing the incoming light-beam at each station to that station's incoming light-beam receiving apparatus.

35. The combination of claim 34 including means, at each station, for impressing data onto its exiting light-beam; and
means, at each station, for causing the incoming light-beam receiving apparatus to recover the data on the single incoming light-beam.

36. A station for optical communications system utilizing a narrow information-bearing optical beam, comprising:
transmitting means for generating an optical beam to be transmitted;
an optical system for collecting and projecting incoming and exiting optical beams along a common optical axis;
receiving means for utilizing an incoming optical beam; and
separator means, interposed on said common optical axis between the optical system and the receiving and transmitting means, for passing to the optical system substantially all of the optical beam from the transmitter means, and for passing to the receiver means substantially all of the incoming optical beam from the optical system.

37. The structure of claim 36 including:
scan-waveform and steering-signal controlled beam-steering means interposed between the optical system and the separator means for controlling the direction of received and transmitted light-beams along a common optical path.

38. A station for a two-way optical communication system comprising:
means for producing an exiting light-beam;
means for impressing only communication-data onto said exiting light-beam;
means for steering said exiting light-beam toward a target station;
means for receiving a single incoming light-beam from said target station, said single incoming light-beam adapted to have only communication-data modulated thereon; and
means for causing said single incoming light-beam to produce both tracking-signals and data-signals.

39. The combination of claim 38 wherein said last means comprises means for causing light of said incoming light-beam to impinge upon a tracking tube that produces said tracking-signals; and
means for causing said tracking-signals to cause said beam-steering means to cause said exiting light-beam to track a target.

40. The combination of claim 38 wherein said last means comprises means for causing a portion of the light of said single incoming light-beam to impinge upon a tube that produces said data-signals.

41. The combination of claim 38 including means for searching for a target, said searching means comprising means for producing scan-waveforms, and means for applying said waveforms to said steering means for causing said waveforms to steer said exiting light-beam in a searching pattern to produce a searching mode of operation.

42. The combination of claim 38 including means for searching for a target, said searching means comprising a variable-opening field-stop in the path of said incoming beam, means for enlarging said variable-opening for coarse searching, and means for constricting said variable-opening for fine searching, said enlarging and constricting means comprising a flip-flop circuit actuated by said tracking-signal producing means.

43. The combination of claim 38 including means for acquiring a target, said acquiring means comprising a retro-reflector at said target, said retro-reflector having a quarter-wave plate associated therewith;
means for causing said exiting light-beam to have a given polarization; and
means for causing said incoming light-beam receiving means to be responsive to a different polarization—whereby the searching exiting light-beam is reflected by said retro-reflector in the desired polarization to be received by said light-beam receiving means.

44. The combination of claim 38 wherein said means for acquiring a target includes;
means for causing the mere presence of a non-necessarily-modulated light-beam from said target to produce an acquisition-signal when a target has been acquired; and
means for causing said acquisition-signal to terminate said searching mode of operation, and to initiate a tracking mode of operation.

45. The combination of claim 38 wherein said exiting and incoming light-beams are coaxial, and have a common optical axis; including means for minimizing crosstalk between said exiting and incoming light-beams, said crosstalk-minimizing means comprising a beam-separator positioned on said common optical axis.

46. The combination of claim 45 wherein said exciting light-beam has a different wavelength than said incoming light-beam, and said crosstalk-minimizing means comprises a dichroic mirror.

47. The combination of claim 45 wherein said exciting light-beam has a different polarization than said incoming light-beam, and said crosstalk-minimizing means comprises a polarizing beam-splitter.

48. The combination of claim 45 wherein said crosstalk-minimizing means comprises an apertured mirror, means for causing one of said light-beams to traverse said aperture, and means for causing the other light-beam to be reflected from said mirror.

References Cited

UNITED STATES PATENTS

| | | | |
|---|---|---|---|
| 1,952,326 | 3/1934 | Ludenia | 325—21 X |
| 2,064,894 | 12/1936 | Espenschied | 325—21 X |
| 2,369,622 | 2/1945 | Toulon | 250—199 |
| 2,437,608 | 3/1948 | Long et al. | |
| 2,538,063 | 1/1951 | Touvet | 250—199 X |
| 2,877,284 | 3/1959 | Schultz | 250—203 X |
| 2,930,894 | 3/1960 | Bozeman | 250—203 |
| 2,953,059 | 9/1960 | Rodman et al. | |
| 2,958,258 | 11/1960 | Kelly | 350—173 X |
| 2,982,859 | 5/1961 | Steinbrecher | 250—203 X |
| 2,993,997 | 7/1961 | McFarlane | 250—203 |
| 3,020,792 | 2/1962 | Kingsbury. | |
| 3,038,079 | 6/1962 | Mueller | 250—203 |
| 3,111,587 | 11/1963 | Rocard | 250—199 |
| 3,215,842 | 11/1965 | Thomas | 250—199 |

RODNEY D. BENNETT, Jr., Primary Examiner

D. C. KAUFMAN, Assistant Examiner

Notice of Adverse Decision in Interference

In Interference No. 100,888, involving Patent No. 3,504,182, V. F. Pizzurro, H. E. Fiala, L. A. De Bottari, S. A. Uchizono and L. M. Rubin, OPTICAL COMMUNICATION SYSTEM, final judgement adverse to the patentees was rendered Dec. 21, 1984, as to claim 38.

[*Official Gazette September 17, 1985.*]